W. B. JOHNSON.
GEARING.
APPLICATION FILED JAN. 24, 1911.
1,050,769.
Patented Jan. 14, 1913.
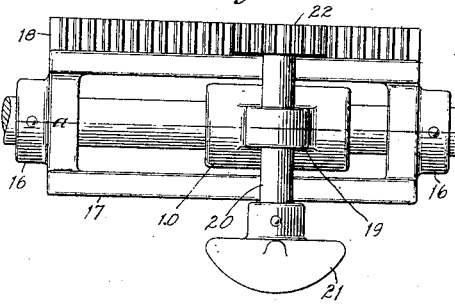
Fig. 1.
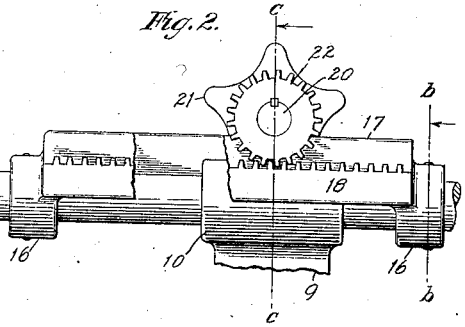
Fig. 2.
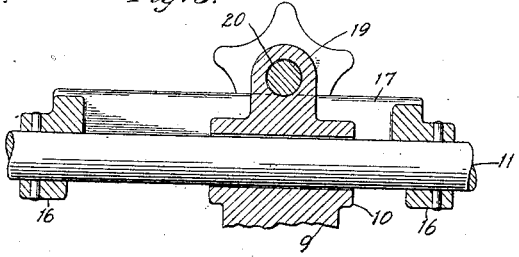
Fig. 3.
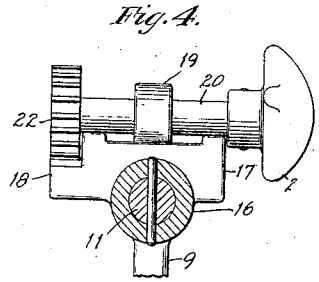
Fig. 4.
Fig. 5.
Fig. 6.
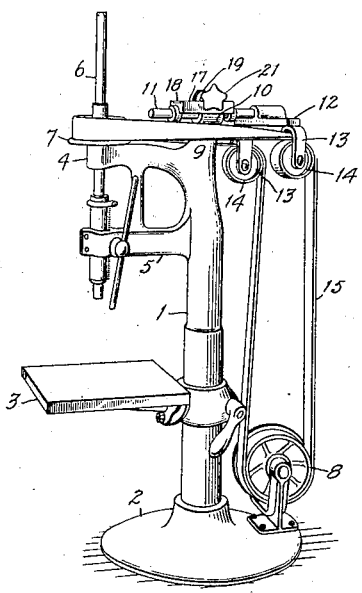
Witnesses:
W. L. Dow.
E. Behel.
Inventor:
William B. Johnson
By A. O. Behel
Atty.

UNITED STATES PATENT OFFICE.

WILLIAM B. JOHNSON, OF ROCKFORD, ILLINOIS, ASSIGNOR TO ROCKFORD LATHE & DRILL COMPANY, OF ROCKFORD, ILLINOIS, A CORPORATION OF ILLINOIS.

GEARING.

1,050,769. Specification of Letters Patent. Patented Jan. 14, 1913.

Application filed January 24, 1911. Serial No. 604,484.

*To all whom it may concern:*

Be it known that I, WILLIAM B. JOHNSON, a citizen of the United States, residing at Rockford, in the county of Winnebago and State of Illinois, have invented certain new and useful Improvements in Gearing, of which the following is a specification.

The object of this invention is to construct a drilling machine in which a belt connection is formed between the drill spindle and counter shaft, and passing over idlers, and in which means for taking up the slack of the belt is provided.

In the accompanying drawings. Figure 1 is a plan view of the mechanism for moving the idlers. Fig. 2 is an end elevation. Fig. 3 is a section on dotted line $a\ a$ Fig. 1. Fig. 4 is a section on dotted line $b\ b$ Fig. 2. Fig. 5 is a section on dotted line $c\ c$ Fig. 2. Fig. 6 is a perspective view of the complete drill.

The drill in the main is of an old construction, and comprises the column 1 supported on the base 2. A table 3 is supported by the column. The upper portion of the column has an overhanging head 4, and beneath this head extends an arm 5. A drill spindle 6 is guided in the overhanging head 4 and arm 5, and is rotated by the pulley 7. A drive pulley 8 is located in connection with the base of the drill. A bracket 9 extends from the upper portion of the column 1, and has a tubular portion 10 within which is located a rod 11, capable of a sliding movement therein. To one end of this rod 11 is secured a cross bar 12 from which are suspended two yokes 13 supporting idle pulleys 14. A belt 15 connects the pulley 7, and the drive pulley 8 and passes over the idlers 14, and by moving the rod 11, the idlers can be adjusted to take up the slack of the belt. To the rod 11 is pinned a yoke comprising the hub ends 16 connected by the side bar 17, and rack bar 18.

From the tubular portion 10 of the column extends a perforated ear 19. A short shaft 20 is located in the ear 19 and has a knob 21 secured to one end, and a spur pinion 22 secured to its other end. The spur pinion 22 meshes with the rack 18, and the rod 20 rests on the upper face of the bar 17, which engagement serves to hold the rod 11 from angular movement.

By means of the knob 21, the spur pinion 22 is rotated which will move the rack 18 carrying the rod 11 with it. As the rod 11 is moved, the idlers 14 carried thereby will be moved bodily, and the slack in the belt 15 will be taken up.

I claim as my invention.

1. In a drilling machine, the combination with the supporting frame, of a drill spindle journaled therein, a pulley on said spindle, a drive pulley, and intermediate idle pulleys, a belt connecting the drill spindle pulley and drive pulley and passing over said idle pulleys, a rod slidably mounted in said frame, said idle pulleys being carried by said rod, a rack rigidly secured to said rod, a shaft journaled in said frame adjacent said rod, and a pinion secured to said shaft and adapted to engage said rack, whereby said rod and idle pulleys may be shifted relative to the frame to vary the tension of the belt, and means coöperating with said shaft for preventing rotation of said rod relative to said frame.

2. In a drilling machine, the combination of a drill spindle, a pulley for rotating the spindle, a drive pulley, and intermediate idle pulleys, a belt connecting the pulley of the drill spindle and the drive pulley, and passing over the idle pulleys, a rod by which the idle pulleys are supported, a yoke connected to the rod and comprising two bars, one provided with a rack, a shaft mounted in a bearing in the drill frame, a spur pinion secured to the shaft and meshing with the rack, the bars of the yoke contacting with the shaft, and a knob for rotating the shaft and thereby preventing rotation of said rod.

In testimony whereof I have hereunto set my hand in presence of two subscribing witnesses.

WILLIAM B. JOHNSON.

Witnesses:
A. O. BEHEL,
E. D. E. N. BEHEL.

Copies of this patent may be obtained for five cents each, by addressing the "Commissioner of Patents, Washington, D. C."